United States Patent
Perlow et al.

(10) Patent No.: US 9,311,681 B2
(45) Date of Patent: Apr. 12, 2016

(54) CLAIMING CONVERSATIONS BETWEEN USERS AND NON-USERS OF A SOCIAL NETWORKING SYSTEM

(75) Inventors: Jonathan David Perlow, San Francisco, CA (US); Benjamin Peter Davenport, Palo Alto, CA (US); Lucy Congyun Zhang, Palo Alto, CA (US); Ben Gertzfield, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/356,951

(22) Filed: Jan. 24, 2012

(65) Prior Publication Data

US 2013/0191466 A1 Jul. 25, 2013

(51) Int. Cl.
*G06F 15/16* (2006.01)
*G06Q 50/00* (2012.01)
*H04L 12/58* (2006.01)
*G06Q 10/10* (2012.01)

(52) U.S. Cl.
CPC .............. *G06Q 50/01* (2013.01); *G06Q 10/107* (2013.01); *H04L 51/32* (2013.01)

(58) Field of Classification Search
USPC .................................................. 709/20, 206
See application file for complete search history.

(56) References Cited

U.S. PATENT DOCUMENTS

| | | | | |
|---|---|---|---|---|
| 7,627,828 B1* | 12/2009 | Collison | .............. | G06Q 10/107 709/204 |
| 8,131,745 B1* | 3/2012 | Hoffman | .............. | G06Q 10/107 707/766 |
| 8,572,199 B2* | 10/2013 | Piper | .................... | G06Q 10/101 709/204 |
| 8,620,942 B1* | 12/2013 | Hoffman | .............. | G06Q 10/107 707/766 |
| 2006/0088038 A1* | 4/2006 | Ravula et al. | ................. | 370/397 |
| 2007/0118802 A1* | 5/2007 | Gerace | .............. | G06F 17/30867 715/738 |
| 2008/0091723 A1* | 4/2008 | Zuckerberg | ............. | G06Q 30/02 |
| 2008/0103907 A1* | 5/2008 | Maislos | ............ | G06F 17/30867 705/14.54 |
| 2008/0222308 A1* | 9/2008 | Abhyanker | ............ | G06Q 10/10 709/245 |
| 2009/0100355 A1* | 4/2009 | Takemura | ........... | H04L 12/2803 715/757 |
| 2010/0306404 A1* | 12/2010 | Wakita | ................ | G06F 21/6245 709/231 |
| 2011/0225481 A1* | 9/2011 | Zuckerberg | ....... | G06F 17/30265 715/205 |
| 2011/0231747 A1* | 9/2011 | Zuckerberg | ....... | G06F 17/30265 715/206 |
| 2012/0079023 A1* | 3/2012 | Tejada-Gamero | ..... | G06Q 50/01 709/204 |
| 2012/0089698 A1* | 4/2012 | Tseng | .................. | G06Q 10/101 709/217 |
| 2012/0110087 A1* | 5/2012 | Culver | ................ | G06F 17/5004 709/205 |
| 2012/0110473 A1* | 5/2012 | Tseng | .................... | G06Q 50/01 715/753 |
| 2013/0097238 A1* | 4/2013 | Rogers | .................... | H04W 4/18 709/204 |
| 2013/0191466 A1* | 7/2013 | Perlow | .................. | G06Q 50/01 709/206 |
| 2013/0198096 A1* | 8/2013 | Lynch | .................... | G06Q 50/01 705/319 |

* cited by examiner

*Primary Examiner* — Farid Homayounmehr
*Assistant Examiner* — Sanchit Sarker
(74) *Attorney, Agent, or Firm* — Fenwick & West LLP

(57) ABSTRACT

Users of a social networking system initiate conversations between other users and additional users who may not be registered to use the social networking system. Each additional user is identified by an item of contact information, and conversation messages are sent to an additional user using the contact information. The conversations are associated with the item of contact information and saved in the social networking system. A user of the social networking system may subsequently claim the item of contact information. The claiming user is given access to the associated conversations if the social networking system can verify that the item of contact information belongs to the claiming user.

18 Claims, 6 Drawing Sheets

US 9,311,681 B2

CLAIMING CONVERSATIONS BETWEEN USERS AND NON-USERS OF A SOCIAL NETWORKING SYSTEM

BACKGROUND

This invention relates generally to social networking, and more specifically to conversations between registered users of a social networking system and additional users who are not registered users of the social networking system.

Methods of electronic communication, such as email and text messaging, have grown rapidly and are starting to replace older forms of communication, such as telephone conversations and physical mail. One drawback of these forms of electronic communication is that users need to provide an item of contact information, such as an email address or mobile phone number, in order to route the communication to the intended recipient. As a result, a user is limited to communicating with people who have shared their contact information with the user.

Many social networking systems include a conversation feature that allows registered users to exchange communications through the social networking system, and these conversations have become an increasingly popular method of electronic communication. Unlike other forms of electronic communication, there is no need for a registered user to obtain an item of contact information before initiating a conversation with another registered user of the social networking system. The social networking system may also enhance the conversation by adding additional features, such as a cover picture identifying each user in the conversation or links to the user profile corresponding to each user. As a result, many users prefer to carry out their electronic communications over a social networking system rather than through other forms of electronic communication.

Currently, conversations are only possible between registered users of the social networking system. No method exists for registered users of a social networking system to include additional users in a conversation if the additional users are not registered users. As a result, it is also impossible for an additional user to be included in a conversation even if one or more of the registered users has some other item of contact information for the additional user that could be used to send messages to the additional user, such as a mobile phone number or email address belonging to the additional user.

SUMMARY

Embodiments of the invention allow registered users of a social networking system to initiate conversations with additional users who may not be registered with the social networking system. The initiating user identifies each additional user by providing an item of electronic contact information, such as a mobile phone number. If the contact information is already stored in an existing user profile on the social networking system, the user profile is associated with the conversation, and the social networking system may use its regular user interface to display conversation messages to the registered user who owns the user profile. If the contact information is not stored in an existing user profile, the social networking system stores the contact information in a contact profile that is meant to represent the additional user (called the contact user), and associates the contact profile with the conversation. Since the contact user may not be a registered user of the social networking system and thus may not be able to view the system's user interface, the social networking system uses the item of contact information to send conversation messages to the contact user.

In addition to allowing registered users to establish conversations with contact users, the social networking system also saves the contact profile and maintains the association between the conversation and the contact profile. The contact information in the contact profile may subsequently be claimed by a registered user of the social networking system. The claiming user may be an existing registered user who is adding additional contact information to their user profile or a newly-registered user who is adding contact information to their user profile for the first time. Alternatively, the social networking system may use a variety of prediction methods to determine that the item of contact information belongs to an existing registered user and query the predicted user to confirm the information. After verifying that the contact information belongs to the claiming user or the predicted user, the social networking system associates the conversation with the user's profile, and the user is able to view the conversation.

The features and advantages described in this summary and the following detailed description are not all-inclusive. Many additional features and advantages will be apparent to one of ordinary skill in the art in view of the drawings, specification, and claims thereof.

Figure 1A:
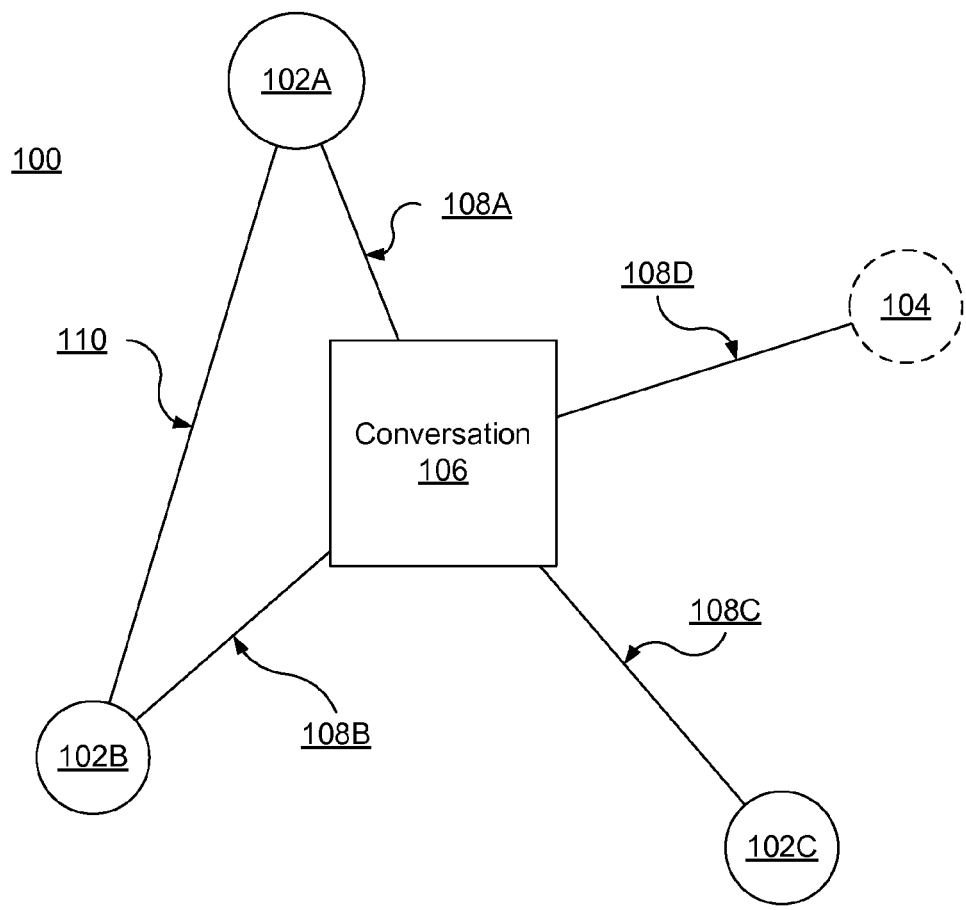
FIG. 1A is a diagram of a social graph containing a conversation associated with several user profiles and one contact profile, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows users to share and exchange information. Users may register to join the social networking system and provide the system with personal information such as their name, birth date, gender, contact information, location, and education/work information. All of this personal information is stored on the social networking system in a user profile associated with the user. A user may also view the personal information stored in user profiles associated with other users subject to any privacy settings that the other users may apply to their profiles. A user profile may also contain a cover image that identifies the user. The cover image may be selected by the user or dynamically selected by the social networking system.

In addition to storing user profiles, the social networking system may also store and maintain several types of non-user objects. Non-user objects are objects that users can interact with on the social networking system. Examples of non-user objects may include, for example, photos, common interest pages, and conversations. Similar to user profiles, each non-user object contains descriptive information that characterizes the object. For example, a photo object might contain an image, a written description of the image, and the date the image was uploaded by the uploading user, and a user may interact with the photo object by viewing the image or adding associations between the photo object and user profiles (i.e., 'tagging' other users in the image).

The social networking system also maintains edges that describe associations between user profiles and non-user objects on the social networking system. Two user profiles may be connected by an edge to indicate that a relationship exists between the two users. The edge may also have additional properties to classify the relationship between the two users. For example, an undirected edge may indicate that the two users have formed a mutual connection (e.g., the two users are 'friends') whereas a directed edge originating at a first user and directed toward at a second user may indicate that the second user did not consent to the connection (e.g., the first user is 'subscribed' to the second user). Edges may also connect a user profile to a non-user entity to indicate that the user profile is associated with the non-user entity. For example, an edge connecting a user profile to a common interest page may indicate that the user possesses the interest described on the common interest page, and an edge connecting a user profile to a photo object may indicate that the user is shown in the photo. The collection of user profiles, non-user objects, and edges can collectively be referred to as a social graph.

FIG. 1A is a diagram of a social graph 100 surrounding a conversation between an initiating user, two other registered users, and a contact user, in accordance with one embodiment of the invention. The social graph 100 contains a conversation object 106 to represent the conversation, user profiles 102 to represent the registered users, and a contact profile 104 to represent the contact user. The edges 108 connect the four profiles 102A, 102B, 102C, 104 to the conversation object 106, and another edge 110 directly connects two user profiles 104A, 104B. A social graph 100 in a different embodiment may contain additional, fewer, or different edges, user profiles, conversation objects, or other non-user objects.

The user profiles 102 are associated with users who have registered to use the social networking system. During the registration process, the social networking system may require a registering user to provide a few items of basic personal information, such as a full name, birth date, and one item of contact information (e.g., an email address). Each item of basic personal information is then stored in a new user profile 102 that is created for the registering user. As a result, each user profile 102 contains enough information for other users of the social networking system to identify the user associated with the user profile.

One of the user profiles 102 is the initiating user profile 102A, which corresponds to an initiating user who submits a request to initiate a conversation. The request may contain an initial conversation message, identifiers for one or more registered users of the social networking system who are to be included in the conversation, one or more items of contact information identifying additional users who are to be included in the conversation but may not be registered users of the social networking system, and additional information associated with the additional users. For each item of contact information, the social networking system determines whether the contact information is already stored in an existing profile 102, 104. The existing profile may be either a user profile 102 or a contact profile 104. If the contact information is found in an existing profile 102, 104, then the social networking system associates the existing profile with the conversation. This may occur if the initiating user possesses the contact information of another user but is not aware that the other user is registered to use the social networking system. If the contact information is not found in an existing profile 102, 104, then the social networking system creates a new contact profile 104.

The contact profile 104 is associated with an additional user who is part of the conversation but is not registered to use the social networking system. After the social networking system creates the contact profile 104, the system associates the contact profile 104 with the conversation object 106. The contact profile 104 is described in detail with reference to FIG. 1B.

The conversation object 106 is a non-user object that represents the conversation between the users. The conversation object 106 may contain, among other things, one or more conversation messages that can be viewed by each user associated with the conversation, a timestamp for each conversation message indicating when the message was sent, and an identifier for the user who sent each message. The social networking system may also enhance the user interface for the conversation object 106 by adding a cover picture identifying each registered user in the conversation or a link to view the user profile 102 corresponding to each registered user in the conversation.

The edges 108 between each profile 102, 104 and the conversation object 106 indicate that the conversation object 106 is associated with each of the profiles 102, 104. The associated profiles 102, 104 are allowed to view the conversation messages and other information stored in the conversation object 106 and add new conversation messages to the object 106. The edge 110 between the user profiles 102A, 102B indicates that a relationship exists between the user profiles 102A, 102B (e.g., the two users are 'friends' on the social networking system). Although there is no edge 110 directly connecting the user profiles 102A, 102C, the initiating user 102A is still able to include the user profile 102C in the conversation request. In general, the social networking system may not require that all user profiles 102 be connected to each other before being associated with the same conversation object 106.

Figure 1B:
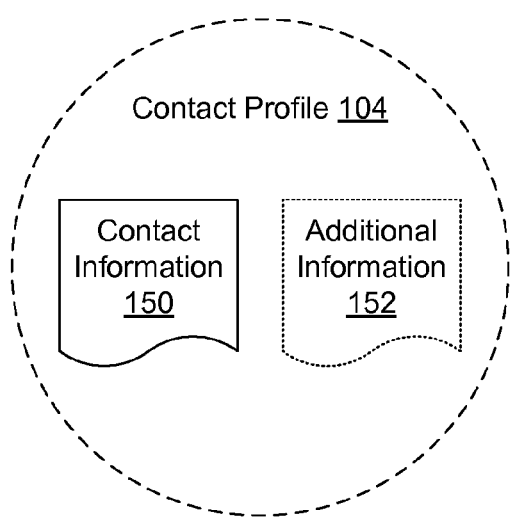
FIG. 1B is a diagram illustrating a contact profile in detail, in accordance with an embodiment of the invention.

FIG. 1B is a diagram illustrating a contact profile 104 in detail, according to one embodiment. A contact profile 104 contains an item of contact information 150 and, optionally, some additional information 152 associated with the contact user. In other embodiments, the contact profile may contain additional or different information. As described with reference to FIG. 1A, the social networking system creates a contact profile 104 after receiving a request to initiate a conversation and determining that an item of contact information included in the request is not found in an existing user profile 102 or an existing contact profile 104. After the social networking system creates the new contact profile 104, the system saves the item of contact information 150 in the new profile 104.

The item of contact information 150 is any piece of contact information that may be used to send conversation messages to the contact user. For example, if the initiating user provided a mobile phone number to be used as the item of contact information 150, then conversation messages might be sent to the contact user over the short message service (SMS). Alternatively, if the initiating user provided an email address as the item of contact information 150, then conversation messages might be sent to the contact user via email.

In addition to providing an item of contact information 150 as part of the request to initiate a conversation, the initiating user may also provide additional information 152 associated with the item of contact information 150. If any additional information 152 is included with the contact information 150, the social networking system saves the additional information 152 with the contact information 150 in the contact profile 104. Additional information 152 may include, among other things, a name, a photograph, a street address. The additional information 152 may also include a second item of contact information that is different from the item of contact information 150 used to identify and send conversation messages to the contact user. For example, if the initiating user provided a phone number as the item of contact information 150 (e.g., with the intention of having messages delivered to the additional user via SMS), then the additional information 152 may include the contact user's email address or additional phone numbers (e.g., a landline or office phone number) for the contact user. Alternatively, if the contact user's email address is stored as the item of contact information 150, then the additional information may include a phone number or a secondary email address for the contact user.

In many cases, this additional information 152 already exists on an initiating user's client device. For example, if the initiating user is using a smartphone to generate the conversation request, the smartphone may include an address book application that maintains a database of personal information associated with the user's friends and acquaintances. If the initiating user is using an application that runs natively on the smartphone's operating system to interact with the social networking system, the operating system may allow the native application to access the database of personal information. This would allow the user to select a contact from the address book application and add the personal information associated with the contact (including an item of contact information) to the conversation request. Upon receiving the request, the social networking system may save the item of contact information 150 separately from the additional information 152 that was associated with the contact.

Figure 2:
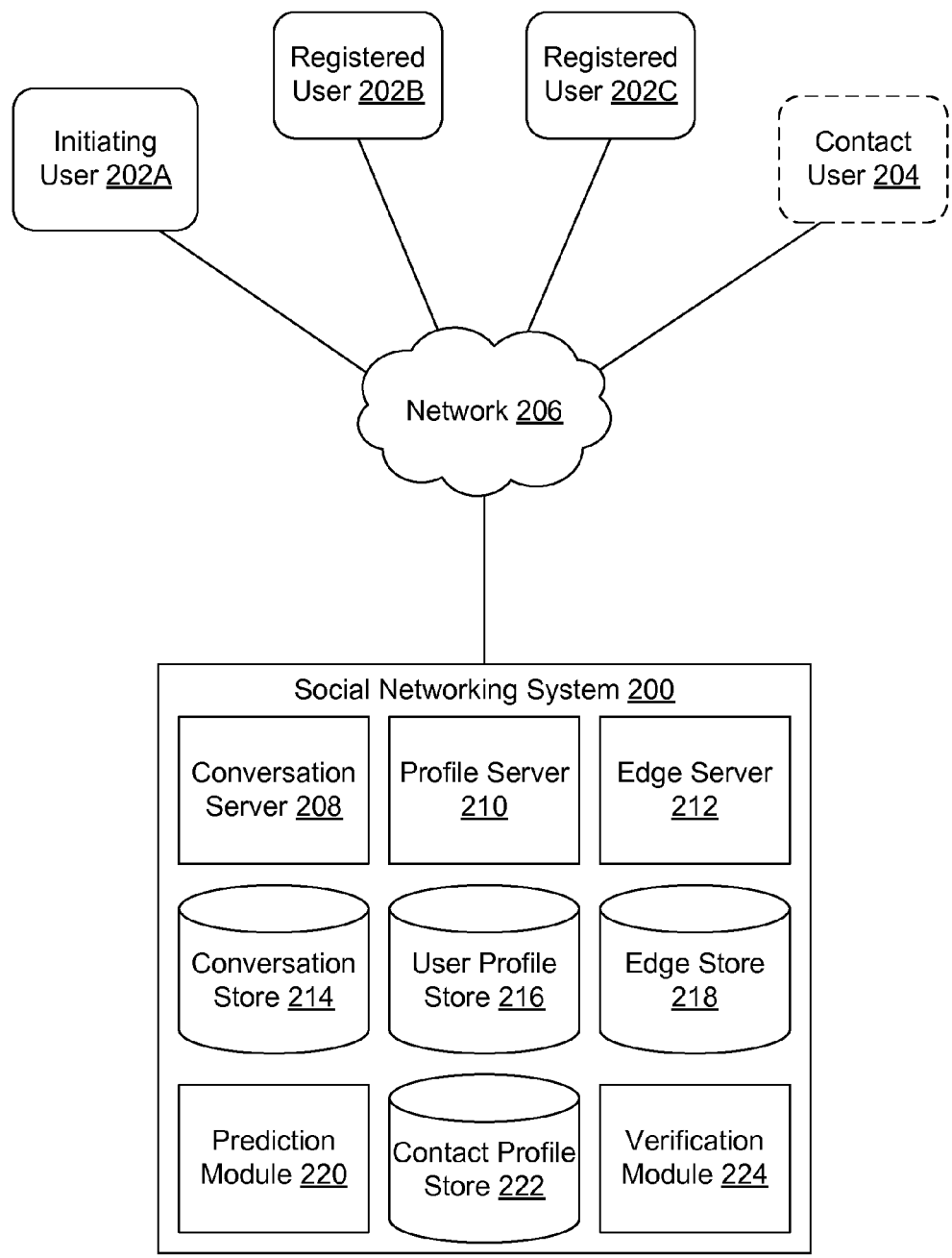
FIG. 2 is a network diagram of a system for storing and claiming conversations between registered users and contact users, showing a block diagram with components of the social networking system, in accordance with an embodiment of the invention.

FIG. 2 is a diagram illustrating a system environment suitable for storing and claiming conversations, in accordance with an embodiment of the invention. The system contains registered users 202 and contact users 204 that connect to a social networking system 200 over a network 206 (e.g., the internet). Alternative embodiments may include different and/or additional users or components.

The registered users 202 are users who have registered to use the social networking system. As described with reference to FIG. 1A, the social networking system 200 maintains a user profile 102 corresponding to each registered user. Since they have registered to use the social networking system, the registered users 202 may interact with the social networking system's user interface through a web browser or an application that runs natively on the registered user's client device. The initiating user 202A uses the user interface to submit a request to create a new conversation, and all registered users 202 may use the user interface to view and add messages to the conversation after the conversation is created.

The contact user 204 is a user who has not registered to use the social networking system 200 but is still part of a conversation. As described with reference to FIG. 1B, the social networking system 200 maintains a contact profile 104 associated with the contact user, and information associated with the contact user 204 is saved in the corresponding contact profile 104. Since the contact user is not registered to use the social networking system 200, the contact user 204 may not interact with the system's user interface. Instead, the social networking system 200 sends conversation messages to the contact user 204 using the item of contact information 150 saved in the corresponding contact profile 104. For example, if the item of contact information was a mobile phone number, then the social networking system 200 may send the message to the mobile phone number over SMS, and the contact user 204 may interact with the other users in the conversation by replying to the message.

FIG. 2 also contains a high-level block diagram of the social networking system 200, according to one embodiment. The social networking system 200 contains a conversation server 208, a profile server 210, an edge server 212, a conversation store 214, a user profile store 216, a contact profile store 220, an edge store 218, a prediction module 220, and a verification module 224. In other embodiments, the social networking system 200 may include additional, fewer, or different components that perform other functions. Conventional components such as network interfaces, security functions, load managers, and backup servers are not included in the figure so as to not obscure the details of the system.

The conversation server 208 manages conversations between users of the social networking system 200. When the social networking system 200 receives a request to initiate a new conversation, the request is routed to the conversation server 208. As described with reference to FIG. 1A, the request to initiate a new conversation may contain an initial conversation message, identifiers for one or more registered users, items of contact information identifying one or more additional users, and additional information associated with the additional users. After receiving the request, the conversation server 208 creates a new conversation object 106 in the conversation store 214 and saves the initial conversation message in the object 106. The conversation server 208 may also add a timestamp to the conversation message to indicate when the message was received and send a notification to each user associated with the conversation indicating that the new conversation object 106 has been created.

The conversation server 208 sends parts of the conversation request to other components of the social networking system 200. The identifiers for the registered users are sent to the edge server 212 so edges 108 can be created between the corresponding user profiles 102 and the new conversation object 106. Meanwhile, the conversation server 208 passes each item of contact information and each item of additional information to the profile server 210, and the profile server 210 processes and stores the information accordingly.

In addition to processing requests to initiate new conversations, the conversation server 208 also processes requests to add conversation messages to existing conversation objects 106 in the conversation store 214. When the conversation server 208 receives a request to add a conversation message, the server 208 modifies the conversation object 106 to include the new message. The conversation server 208 may also send a request to the edge server 212 for a list of profiles 102, 104 associated with the conversation object 106 and send a notification to the corresponding users 202, 204. For registered users 202, the notification may be displayed in the user interface of the social networking system and/or sent through some other form of communication (e.g., email). A notification sent to a registered user 202 may contain the content of the new message, or it may contain a short notice instructing the user to access the social networking system 200 to view the message. For contact users 204, the notification is sent using the item of contact information 150 in the corresponding contact profile 104. A notification sent to a contact user 204 contains the content of the message because contact user may not able to view the message using the social networking system's user interface.

The conversation server 208 also processes requests from users to view existing conversation objects 106. After receiving a request from a user to view a conversation, the conversation server 208 instructs the edge server 212 to verify that an edge 108 exists between the corresponding profile 102, 104 and the requested conversation object 106. If an edge 108 exists, then the conversation server 208 grants the request and allows the requesting user to view the user interface for the conversation object 106.

The profile server 210 processes requests to view, modify, or create new profiles 102, 104 stored in the user profile store 216 or the contact profile store 222. For example, when a new user registers to join the social networking system 200, the profile server 210 receives a request to create a user profile 102 corresponding to the new user. Before creating the new profile 102, the profile server 210 may query the new user to provide some basic personal information, such as a name, a birth date, and an item of contact information to ensure that the new profile 102 contains enough information to be identified later on. After receiving the information, the profile server 210 creates a new user profile 102 in the user profile store 216.

The profile server 210 also receives data from the conversation server 208 when the conversation server 208 receives a request to initiate a conversation that includes additional users who may not be registered to use the social networking system 200. The data received from the conversation server 208 includes items of contact information associated with the additional users and may also include additional information associated with the additional users. For each item of contact information, the profile server 210 searches through both the user profile store 216 and the contact profile store 222 to determine whether the item of contact information is associated with an existing profile. If the item of contact information is associated with a user profile 102 or a contact profile 104, then the profile server 210 instructs the edge server 212 to create an edge 108 between the profile 102, 104 and the new conversation object 106. The profile server 210 may optionally store any additional data associated with the item of contact information in the user profile 102. In the case where the item of contact information was associated with a contact profile 104, the profile server 210 may also combine the received additional data with any additional information 152 already saved in the contact profile 104 and send the combined data to the prediction module 220.

If the profile server 210 determines that the item of contact information is not associated with any preexisting profile 102, 104, then the profile server 210 creates a new contact profile 104 in the contact profile store 222 and saves the item of contact information 150 in the new contact profile 104. If any additional information 152 was received as part of the conversation request, the profile server 210 may also store the additional information 152 in the new contact profile 104 and send the additional information 152 to the prediction module 220. The profile server 210 also instructs the edge server 212 to create a new edge 108 between the new contact profile 104 and the new conversation object 106.

The profile server 210 also processes requests from registered users 202 to add or modify information on their user profiles 102. In particular, when a registered user 202 submits a request to claim an item of contact information and add the contact information to their user profile 102, the profile server 210 searches through the contact profile store 222 to determine whether the item of contact information is saved in a contact profile 104. If the contact information is found, then the claim request is sent to the verification module 224 to confirm that the contact information belongs to the claiming user. If the verification module 224 verifies the claim, then the profile server 210 instructs the edge server 212 to find the conversation objects connected to the contact profile 104 and create new edges connecting those conversation objects to the user profile 102 associated with the claiming user. After the edge server 212 creates the new edges, the conversation server 208 allows the claiming user to view the conversation objects.

The edge server 212 processes requests to create or modify edges in the social graph. For example, when a registered user 202 wishes to form a connection to another registered user 202 or to a non-user entity, the edge server 212 receives a request from the user 202 to form a new edge. For requests to form non-directed edges between user profiles (i.e., 'friend requests'), the edge server 212 may request permission from the user corresponding to the second profile before forming the edge 110. For most other user requests (e.g., requests to connect to non-user entities, requests to remove an edge), the edge server 212 may execute the request without obtaining permission from any user.

Apart from user requests, the edge server 212 may also process requests from other components of the social networking system 200, including the conversation server 208 and the profile server 210. For example, the conversation server 208 or the profile server 210 may both submit requests to form new edges 108 between a conversation object 106 and a plurality of profiles 102, 104.

The prediction module 220 receives a contact profile 104 and uses a variety of methods of predict whether the item of contact information 150 stored in the contact profile 104 belongs to a registered user 202 of the social networking system 200. In particular, the prediction module may use the additional information 152 stored in the contact profile 104 to calculate a prediction. As described with reference to FIG. 1B, the additional information 152 may be any information stored in association with the contact information 150 on the initiating user's client device (e.g., the information associated with a contact in an address book application on a smartphone), such as a name, an alias (e.g., the user may have an entry in the address book called 'mom'), a picture, a street address, or a second item of contact information. The prediction module 220 may use several methods to analyze this additional information 152 and attempt to match the information to an existing user profile 102. The prediction module 220 may also receive and analyze additional information, such as interaction data between the contact user 204 and one or more registered users 202 or profile information from one or more registered users 202. The components of the prediction module 220 are described in detail with reference to FIG. 3A.

The verification module 224 receives requests to claim items of contact information and uses various methods to confirm that the item of contact information belongs to the claiming user. For example, if the item of contact information was a mobile phone number, the verification module 224 may send a verification code to the mobile phone number over the Short Message Service (SMS) and instruct the claiming user to input the code in a field in the user interface of the social networking system. The components of the verification module 224 are described in detail with reference to FIG. 3B.

Figure 3A:
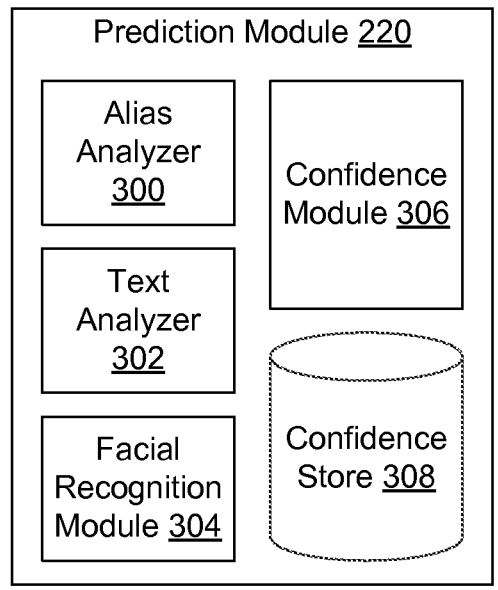
FIG. 3A is a block diagram illustrating the prediction module of the social networking system in detail, in accordance with an embodiment of the invention.

FIG. 3A is a block diagram illustrating the prediction module 220 of the social networking system 200 in detail, according to one embodiment. The prediction module 220 includes an alias analyzer 300, a text analyzer 302, a facial recognition module 304, a confidence module 306, and a confidence store 308. Other embodiments of the invention may include additional and/or different modules and components that may interact with the components that are shown. As described with reference to FIG. 2, the prediction module 220 receives a contact profile 104 and predicts whether the item of contact information 150 stored in the contact profile 104 belongs to a registered user 202 of the social networking system 200.

If the prediction module 220 receives a name as part of the additional information 152 in the contact profile 104, the alias analyzer 300 analyzes the name and attempts to match the name to a user profile 102 in the user profile store 216. If the name matches multiple user profiles 102, the alias analyzer 300 uses additional information, such as interaction data from the edge server 212 to select the user profile 102 that is the most probable match. For example, if the alias analyzer 300 receives the name "John Smith" as part of the additional information 152, the alias analyzer 300 would analyze user profiles 102 containing the name "John Smith" to determine whether one of the profiles 102 had significantly more connections to other user profiles 102 that were part of conversations that were also associated with the contact profile 104. If a partial name (e.g., "John S.") was included as part of the additional information 152, the alias analyzer 300 performs the same process with possible variations of the partial name. To reduce the processing time taken by the name matching process, the alias analyzer 300 may begin by checking user profiles that are connected to the initiating user (i.e., the initiating user's friends).

The additional information 152 may also contain multiple names if, for example, multiple initiating users 202A assigned different names to the same item of contact information in their respective address book applications. For example, a first initiating user may associate an item of contact information with the name "Jane Smith," whereas a second initiating user may associate the same item of contact information with "Jane S.," and a third initiating user may associate the item of contact information with the name "Mom." In this case, the alias analyzer 300 may ask some of the initiating users to verify the names that they submitted. For example, the third initiating user may receive a query that asks, "Are Jane S. from your contacts and Jane Smith the same person?"

The alias analyzer 300 may also interpret and analyze less formal names that are included as part of the additional information 152. For example, if the additional information 152 contains a name indicating a familial relationship (e.g., "Mom") and does not contain any additional names from other initiating users, the alias analyzer 300 may query the profile server 210 to check if the initiating user's identified another registered user as their mother in their profile.

The text analyzer 302 attempts to match any other non-multimedia data in the additional information 152 to a user profile 102. For example, if the additional information 152 is taken from an address book application on a smartphone, the additional information 152 may include a street address, city of residence, date of birth, phone number, email address, or some other text-based item of personal information that may be used to identify the user associated with the item of contact information. The text analyzer 302 analyzes this personal information and searches the user profile store 216 to identify user profiles that contain the same data.

If the additional information 152 includes a cover picture, then the facial recognition module 304 analyzes the cover picture using facial feature recognition methods that are well-known in the art to determine whether the cover picture contains a face that matches the facial features of a registered user 202. The facial recognition module 304 may determine whether the cover picture contains the facial features of a given registered user by comparing the cover picture to photo objects in which the registered user is tagged.

The confidence module 306 analyzes the results from the alias analyzer 300, the text analyzer 302, and the facial recognition module 304 to calculate a prediction and a confidence score for the prediction. In one embodiment, the prediction contains an identifier for the registered user 202 that is most likely to own the contact information 150 stored in the contact profile 104, and the confidence score is a scalar value that is related to the probability that the prediction is correct. Both the prediction and the confidence score may be stored in the confidence store 308 for future reference.

The confidence module 306 uses a variety of factors to calculate the confidence score, such as the level of interaction between the contact user 204 and the other users associated with the conversation object 106, the edges connecting the contact profile 104 to other conversation objects 106, and the amount of additional information 152 that matches information in the predicted user profile. For example, if the additional information 152 in the contact profile 104 contains several items of personal information (e.g., a street address, date of birth, and name) that match the information stored in the predicted profile, and several of the user profiles 102 associated with the conversation 106 have edges 110 connecting them to the predicted profile, then the prediction would have a strong confidence score. Meanwhile, if there are few edges 110 connecting the predicted profile to the user profiles 102 associated with the conversation object 102 and only one item of additional information 152 matches the information in the predicted profile (e.g., only the name matches), then the prediction would have a low confidence score. If a confidence score is strong enough to exceed a threshold value, then the prediction module 220 queries the predicted user to confirm that the item of contact information belongs to the user. If the predicted user confirms the prediction, the confirmation is interpreted as a request to claim the item of contact information and the request is sent to the verification module 224.

Figure 3B:
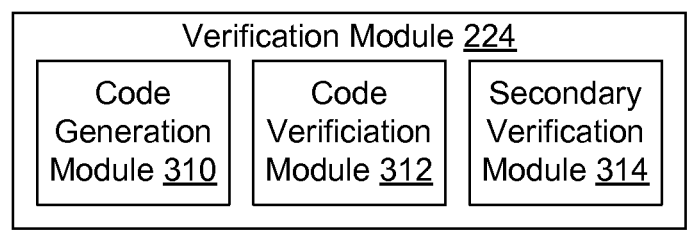
FIG. 3B is a block diagram illustrating the verification module of the social networking system in detail, in accordance with an embodiment of the invention.

FIG. 3B is a block diagram illustrating the verification module 224 of the social networking system 200 in detail, according to one embodiment. The verification module 224 includes a code generation module 310, a code verification module 312, and a secondary verification module 314. Other embodiments of the invention may include additional and/or different modules and components that may interact with the components that are shown.

As described with reference to FIG. 2, the verification module 224 receives a request to claim an item of contact information. A claim request contains the item of contact information being claimed and an identifier corresponding to the user profile 102 that is to be associated with the item of contact information. The verification module 224 may also receive a request from the prediction module 220 to verify a prediction. A request to verify a prediction contains the same data as a claim request.

After the verification module 224 receives a request to claim an item of contact information, the code generation module 310 generates a verification code and sends the code to the user. In one embodiment, the code generation module sends the code to the item of contact information. For example, if the item of contact information was a mobile phone number, then the code generation module 310 sends the code to the mobile phone number as a text message. If the item of contact information was an email address, then the code generation module 310 sends an email message containing the code to the email address. Alternatively, the code generation module 310 may display the code to the claiming user through the user interface of the social networking system 200 with instructions to use the item of contact information to send the code back to the social networking system 200. For example, if the item of contact information was a mobile phone number, the code generation module 310 may instruct the user to send a text message containing a verification code to a phone number that is being monitored by the code verification module 312.

The code verification module 312 receives the verification code from the code generation module 310, prompts the claiming user to input the verification code, and determines whether the user inputs the correct code. In one embodiment, the code verification module 312 prompts the claiming user for the verification code by displaying a user interface on the social networking system 200. In other embodiments, the code verification module 312 may have some other method of verifying the code. For example, the code generation module 310 may instruct the user to use the item of contact information to send the code back to the social networking system 200. After the code verification module 312 receives the code from the claiming user, the module 312 compares the code to the original verification code that was received from the code generation module 310. If the codes match, then the code verification module verifies the identity of the claiming user.

As a safeguard against incorrect verification, the secondary verification module 314 uses additional methods to verify the item of contact information. For example, the secondary verification module 314 may query the initiating user (i.e., the user who initially sent the item of contact information to the social networking system) to confirm that the item of contact information belongs to the claiming user. If the contact profile 104 containing the claimed item of contact information was associated with multiple conversation objects, then the secondary verification module 314 may send the query to the initiating user for each of the conversation objects. The secondary verification module 314 may send a similar query to any other registered user who was associated with any of the conversation objects.

Figure 4:
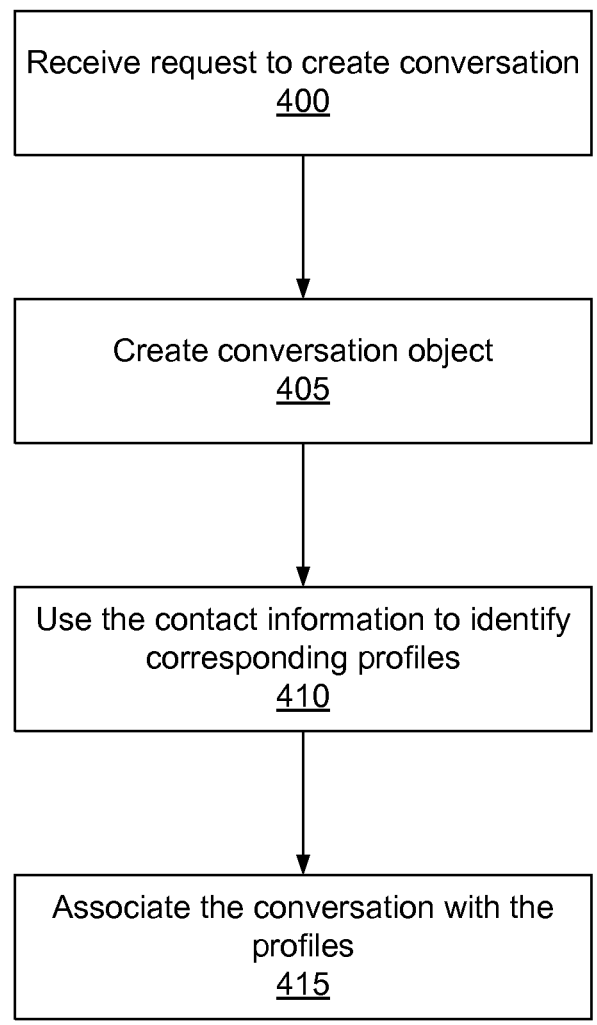
FIG. 4 is a high-level flow chart illustrating a method for creating a conversation between registered users and contact users, in accordance with an embodiment of the invention.

FIG. 4 is a flow chart illustrating a method for creating a conversation between registered users 202 of the social networking system 200 and at least one contact user 204, in accordance with one embodiment. The process begins when the social networking system 200 receives 400 a request from an initiating user 202A to create a new conversation object 106. As described with reference to FIG. 1A, the conversation request contains an initial conversation message, identifiers for one or more registered users of the social networking system who are to be included in the conversation, one or more items of contact information identifying additional users who are to be included in the conversation but may not be registered users of the social networking system, and additional information associated with the additional users.

After the social networking system receives 400 the conversation request, the conversation server 208 creates 405 a new conversation object 106 in the conversation store 214. The conversation server 208 populates the new object 106 with the initial conversation message and a timestamp indicating when the initial message was received. To indicate that the registered users 202 identified in the conversation request are part of the conversation, the conversation server 208 sends the identifiers for the registered users 202 to the edge server 212, and the edge server 212 creates new edges 108 in the edge store 218 to associate the new conversation object 106 with the user profile 102 corresponding to each registered user 202 that is identified.

The conversation server 208 sends the information associated with the additional users (the items of contact information and the additional information) to the profile server 210, and the profile server 210 uses each item of contact information to identify 410 a corresponding profile 102, 104 to associate 415 with the new conversation object. The profile server 210 begins by searching through the user profile store 216 to determine if the item of contact information is stored in a preexisting user profile 102. If a user profile containing the item of contact information is found, then the profile server 210 instructs the edge server 212 to associate 415 the profile 102 with the new conversation object 106. If a user profile 102 is not found, then the profile server 210 searches for the item of contact information in the contact profile store 222. If the profile server finds a contact profile 104 containing the item of contact information, then the profile server instructs the edge server 212 to associate 415 the contact profile 104 with the new conversation object 106. The profile server 210 may also save any additional information associated with the item of contact information in the contact profile 104.

If the item of contact information cannot be found in the user profile store 216 or the contact profile store 222, then the profile server 210 creates a new contact profile 104 and saves the item of contact information 150 and any associated additional information 152 in the new profile 104. After the contact profile 104 is created, the profile server 210 instructs the edge server 212 to associate 415 the new contact profile 104 with the new conversation object 106.

To associate 415 profiles 102, 104 with the new conversation object, the edge server 212 creates new edges 108 in the edge store 218 to connect the new conversation object 106 to the profiles 102, 104. After the conversation object 106 is connected to the profiles 102, 104, the users 202, 204 corresponding to the connected profiles 102, 104 may access the conversation object 106. If a corresponding user is a registered user 202, then the registered user may use the social networking system's user interface to view the messages in the conversation and add new messages to the conversation. If a corresponding user is a contact user 204, then the conversation server 208 uses the item of contact information 150 to send new conversation messages to the contact user 204 as new messages are posted, and the contact user 204 may post messages to the conversation by replying. For example, if the social networking system 200 is sending conversation messages to a contact user 204 as text messages, then the contact user 204 may add new messages to the conversation by replying to the text messages containing the previous conversation messages. After the conversation server 208 receives the text messages, the messages are added to the conversation object 106 and are viewable to other users 202, 204 who are associated with the conversation.

Figure 5:
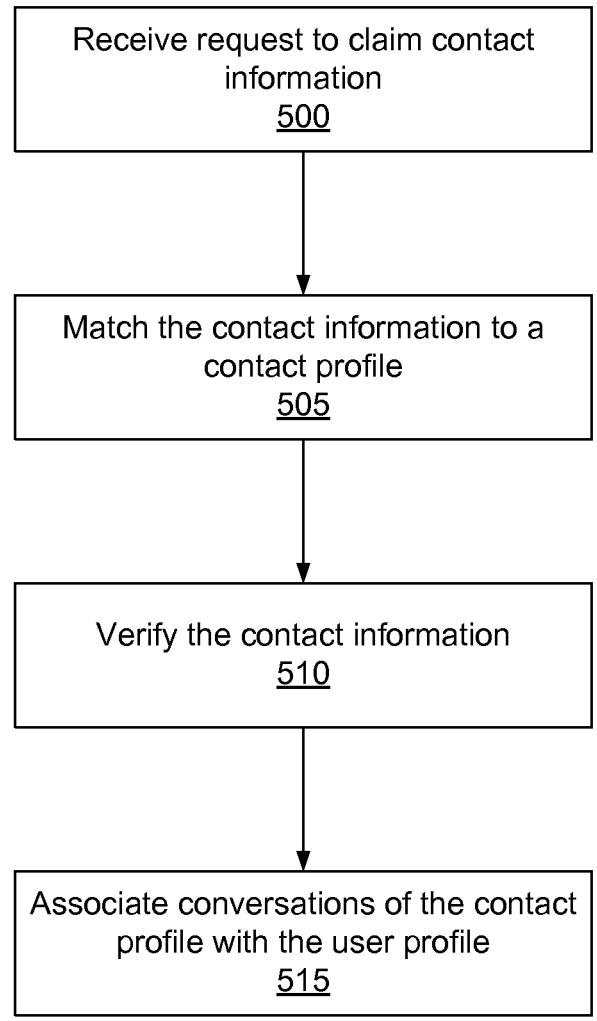
FIG. 5 is a high-level flow chart illustrating a method for associating a conversation with a registered user of the social networking system, in accordance with an embodiment of the invention.

FIG. 5 is a flow chart illustrating a method for processing a request from a registered user 202 to claim an item of contact information 150 that is saved in a contact profile 104, in accordance with one embodiment. First, the social networking system 200 receives 500 a request from a registered user 202 to claim an item of contact information by adding the item of contact information to the user profile 102 corresponding to the user 202. The request to claim contact information may be received 500 from a newly-registered user who is filling out their user profile for the first time, or the request may be received 500 from a pre-existing registered user who is adding additional information to their user profile.

After the social networking system 200 receives the contact information, the profile server 210 searches through the contact profile store 222 and attempts to match 505 the item of contact information to the contact information 150 stored in one of the contact profiles 104. If a matching contact profile 104 is not found, then the process stops and no further action is taken to associate the user profile 102 corresponding to the claiming user with any conversation objects 106. If a matching contact profile 104 is found, then the request to claim the contact information is sent to the verification module 224 to be verified 510.

As described with reference to FIG. 3B, the verification module 224 may use a variety of techniques to verify 510 that the item of contact information 150 belongs to the registered user that submitted the claim request. In one embodiment, the verification module 224 may send a verification code to the item of contact information 150 (e.g., send a text message to a mobile phone number) and ask the claiming user to input the verification code through a user interface of the social networking system 200. In alternative embodiments, the verification module 224 may display the code to the claiming user through the social networking system's user interface and instruct the user to use a device associated with the item of contact information 150 to send the code back to the social networking system 200 (e.g., instruct the user to send the code as a text message to a designated number that is being monitored by the verification module 224). The verification module 224 may also request secondary verification from other registered users 202 who are associated with the same conversation objects 106, either in addition to or instead of receiving verification directly from the claiming user. For example, the verification module 224 may display a user interface to a registered user containing the item of contact information 150 from the contact profile 104, the name associated with the user profile of the claiming user, and an option to verify that the contact information should be associated with the name.

After the verification module 224 determines that the item of contact information 150 belongs to the claiming user, the edge server 212 associates 515 the conversations of the contact profile 104 with the user profile 102 corresponding to the claiming user by creating edges 108 connecting the user profile 102 to each conversation object 106 that was connected to the contact profile 102. Once the edge server 212 creates the new edges 108, the conversation server 208 allows the claiming user to view the claimed conversation objects 106 that were associated with the claimed contact profile 104. In addition, the conversation server 208 may change the user interface of the conversation by adding the claiming user's cover picture and a link to the user profile 102 corresponding to the claiming user. Since some items of contact information 150 may occasionally be reassigned to different users (e.g., cell carriers may recycle mobile phone numbers), the edge server 212 may also establish a time limit for the conversations that may be claimed. For example, the edge server 212 may only associate conversations that are less than two weeks old with the claiming user because older conversations may have taken place when the item of contact information 150 belonged to a different user.

Figure 6:
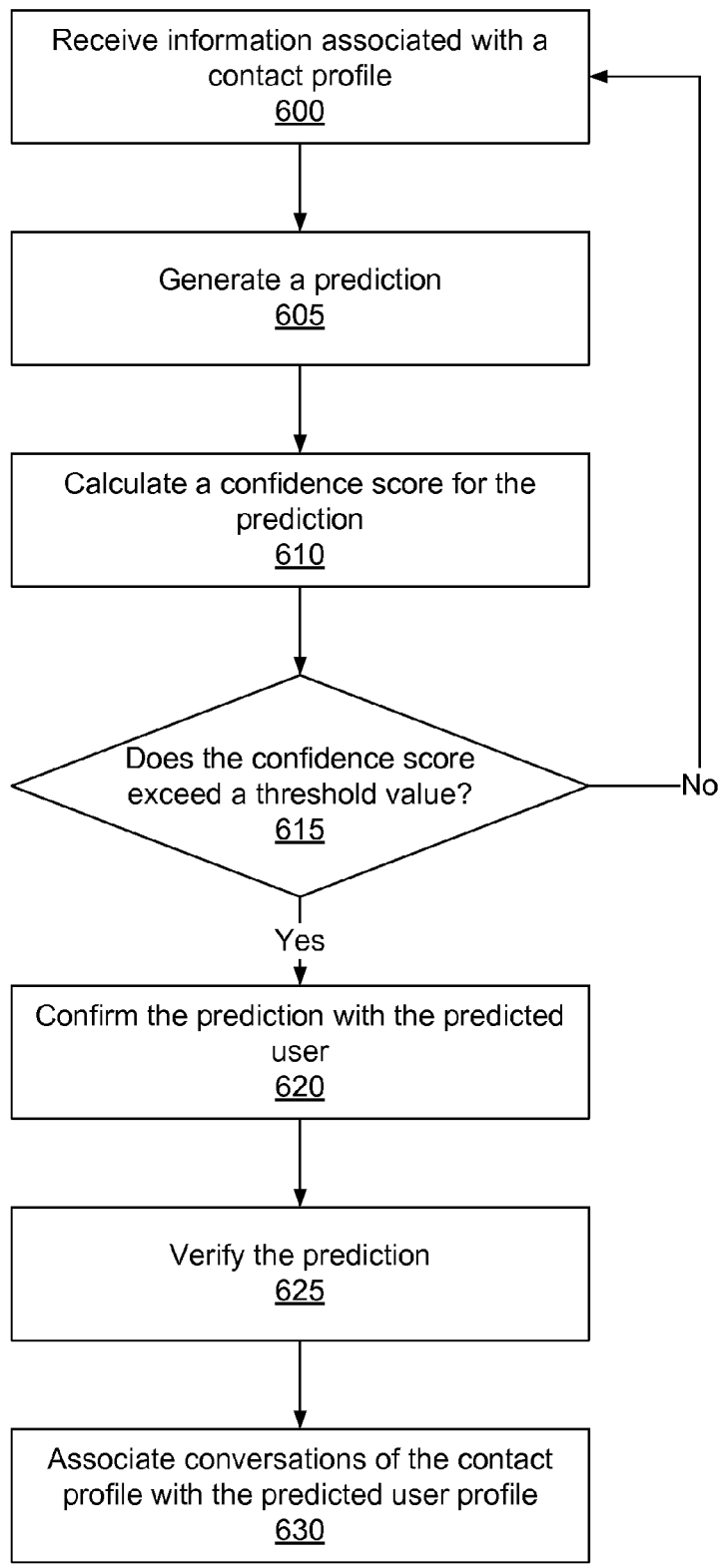
FIG. 6 is a high-level flow chart illustrating a method for predicting that an item of contact information belongs to a registered user of the social networking system, in accordance with an embodiment of the invention.

FIG. 6 is a flow chart illustrating a method for predicting and verifying that an item of contact information 150 belongs to a certain registered user 202, in accordance with one embodiment. The process begins when the social networking system 200 receives 600 a conversation request from an initiating user containing additional information associated with the contact information 150 in a contact profile 102. As described with reference to FIGS. 1B and 3A, the additional information may be taken from a preexisting database of contacts on the initiating user's client device, such as an address book application on a smartphone. The additional information may include, for example, a name or alias, a cover picture, a street address, or a birth date.

After the social networking system 200 receives the additional information, the prediction module 222 uses a variety of methods to generate 605 a prediction that identifies a registered user 202 who is likely to own the item of contact information 150. As described with reference to FIG. 3A, the prediction module 220 may contain modules 300, 302, 304 to analyze a name or alias, match text-based personal information such as a street address or date of birth to a user profile, or use facial recognition methods to match the cover picture to photos that are stored on the social networking system 200. The prediction module 220 compiles the results from each module 300, 302, 304 to identify a registered user 202 who is likely to own the item of contact information 150. In other embodiments, the prediction module 220 may use additional, fewer, or different modules or methods to generate a prediction.

After the prediction module 220 identifies a registered user 202 who is likely to own the item of contact information 150, the prediction module calculates 610 a confidence score that quantifies the strength of the prediction. In one embodiment, a higher confidence score indicates a stronger prediction and thus a higher likelihood that the prediction is correct. The prediction module 220 uses several factors to calculate 610 the confidence score. For example, the confidence score may be higher if more items of information can be matched to the user profile 102 associated with the predicted user, and if the user profile 102 has more connections to other profiles 102, 104 associated with the conversation objects 106 being claimed. In alternative embodiments, a lower confidence score may indicate a stronger prediction, and additional, fewer, or different factors may be used to calculate the confidence score.

The prediction module 220 also determines 615 whether the confidence score exceeds a threshold value. As described with reference to FIG. 3A, if the confidence score exceeds the threshold value, then the prediction module 220 sends a request to the predicted user to confirm 620 that the contact information belongs to the predicted user, and the prediction module 220 transfers the prediction to the verification module 224 if the user confirms the prediction. If the confidence score does not exceed the threshold value, then the prediction module 220 does not send a confirmation request, and the social networking system 200 waits to receive 600 more information associated with the contact profile 104 before generating another prediction.

To verify 625 the prediction with the predicted user, the verification module 224 may use the methods described with reference to FIG. 3B and FIG. 5. In the case of a prediction with an exceptionally strong confidence score, the verification module 224 may rely on the confirmation 620 that the prediction module received from the predicted user and verify the prediction without taking further action. If the confidence score is lower, the verification module 224 may also use previously described methods (e.g., sending/receiving a verification code, querying other registered users) to provide additional verification. After the prediction is verified, the edge server 212 follows the process described with reference to FIG. 5 to associate 625 the conversations of the contact profile 102 with the predicted user profile.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
storing a user profile for each of a plurality of users of a social networking system;
receiving a request to establish a new conversation that includes one or more of the users of the social networking system and an additional user, the additional user identified by an item of contact information that is not stored as contact information for any user profile of the plurality of users of the social networking system;
establishing a conversation between the one or more users of the social networking system and the additional user identified in the request by sending a message to the one or more users via the social networking system and to the additional user via the item of contact information;
creating a record for the additional user, the record including the item of contact information and an association with the conversation;
receiving, at the social networking system, a reply to the message from the item of contact information, the reply sent by the additional user via the item of contact information;
adding the reply to the conversation for viewing by the one or more users of the social networking system;
subsequent to the conversation, receiving, at the social networking system, a claim by a claiming user of the social networking system, the claim identifying the item of contact information as belonging to a user profile of the claiming user;
verifying that the item of contact information belongs to the claiming user; and
storing an association, by a computing device, between the conversation identified by the item of contact information claimed by the claiming user and the user profile of the claiming user.

2. The method of claim 1, further comprising:
responsive to creating a record of the additional user, analyzing the record of the additional user to generate a prediction indicating that the item of contact information belongs to a predicted user of the social networking system;
sending a request to the predicted user to confirm whether the item of contact information belongs to the predicted user.

3. The method of claim 2, wherein receiving a claim by a claiming user comprises:
receiving confirmation from the predicted user that the item of contact information belongs to the predicted user.

4. The method of claim 1, wherein receiving a claim by a claiming user comprises:
receiving a request from the claiming user to create a new user profile, the request identifying the item of contact information for the new user profile.

5. The method of claim 1, wherein receiving a claim by a claiming user comprises:
receiving a request from the claiming user to associate the item of contact information with an existing profile for a user of the social networking system.

6. The method of claim 1, wherein storing an association between the conversation identified by the item of contact information claimed by the claiming user and the user profile of the claiming user comprises making the conversation viewable to the claiming user.

7. A computer program product comprising a non-transitory computer-readable storage medium containing computer program code that, when executed by a processor, causes the processor to:
- store a user profile for each of a plurality of users of a social networking system;
- receive a request to establish a conversation that includes one or more of the users of the social networking system and an additional user, the additional user identified by an item of contact information that is not stored as contact information for any user profile of the plurality of users of the social networking system;
- establish the conversation between the one or more users of the social networking system and the additional user identified in the request by causing a message to be provided to the one or more users via the social networking system and to the additional user via the item of contact information;
- create a record for the additional user, the record including the item of contact information and an association with the conversation;
- receive, at the social networking system, a reply to the message from the item of contact information, the reply sent by the additional user via the item of contact information;
- add the reply to the established conversation for viewing by the one or more users of the social networking system;
- subsequent to the conversation, receive, at the social networking system, a claim by a claiming user of the social networking system, the claim identifying the item of contact information as belonging to a user profile of the claiming user;
- verify that the item of contact information belongs to the claiming user; and
- store an association, by a computing device, between the conversation identified by the item of contact information claimed by the claiming user and the user profile of the claiming user.

8. The computer program product of claim 7, further comprising computer program code that, when executed by the processor, further causes the processor to:
- responsive to creating a record of the additional user, analyze the record of the additional user to generate a prediction indicating that the item of contact information belongs to a user of the social networking system;
- send a request to the predicted user to confirm whether the item of contact information belongs to the predicted user.

9. The computer program product of claim 8, wherein receiving a claim by a claiming user comprises:
- receiving confirmation from the predicted user that the item of contact information belongs to the predicted user.

10. The computer program product of claim 7, wherein receiving a claim by a claiming user comprises:
- receiving a request from the claiming user to create a new user profile, the request identifying the item of contact information for the new user profile.

11. The computer program product of claim 7, wherein receiving a claim by a claiming user comprises:
- receiving a request from the claiming user to associate the item of contact information with an existing profile for a user of the social networking system.

12. The computer program product of claim 7, wherein storing an association between the conversation identified by the item of contact information claimed by the claiming user and the user profile of the claiming user comprises making the conversation viewable to the claiming user.

13. A method comprising:
- storing a user profile for each of a plurality of users of an online system;
- receiving a request to establish a conversation between one or more users of the online system and an additional user identified by an item of contact information that is not stored as contact information for any user profile of the plurality of users of the online system;
- establishing the conversation between the one or more users of the online system and the additional user identified in the request by:
    - sending, via the online system, a message to the one or more users; and
    - sending, via the item of contact information, the message to the additional user;
- receiving, at the online system, a reply to the message from the item of contact information, the reply sent by the additional user via the item of contact information;
- adding the reply to the established conversation for viewing by the one or more users of the online system;
- subsequent to the conversation, receiving, at the online system, a claim by the additional user, the claim identifying the item of contact information as belonging to a user profile of one of the plurality of users of the online system;
- verifying that the item of contact information belongs to the additional user; and
- storing an association, by a computing device, between the conversation identified by the item of contact information and the user profile.

14. The method of claim 13, wherein receiving a claim by the additional user comprises:
- receiving a request from the additional user to create a new user profile with the online system, the request identifying the item of contact information for the new user profile.

15. The method of claim 13, wherein receiving a claim by the additional user comprises:
- receiving a request from the additional user to associate the item of contact information with an existing profile for a user of the social networking system.

16. The method of claim 13, wherein storing an association between the conversation and the new user profile comprises making the conversation viewable to the additional user via the new user profile.

17. The method of claim 13, wherein the item of contact information is an email address.

18. The method of claim 13, wherein the item of contact information is a phone number.

\* \* \* \* \*